United States Patent [19]

Corbier et al.

[11] 4,316,088
[45] Feb. 16, 1982

[54] PROCESS AND DEVICE FOR MEASURING BY INFRARED THERMOMETRY THE TEMPERATURE OF A WIRE, BAR OR TUBE, OR A METAL

[75] Inventors: Robert Corbier, Lyons; Robert Arnaud, La Celle Saint Cloud, both of France

[73] Assignee: I.R. Tec, France

[21] Appl. No.: 114,282

[22] Filed: Jan. 22, 1980

[30] Foreign Application Priority Data

Jan. 23, 1979 [FR] France ............................. 79 01664
Jan. 11, 1980 [FR] France ............................. 80 00646

[51] Int. Cl.³ .................. G01J 1/00; G01N 23/00
[52] U.S. Cl. ............................. 250/338; 250/347; 250/358 P
[58] Field of Search ............... 250/338, 339, 341, 347, 250/358 P, 359; 73/355 R, 355 EM; 356/43, 44, 51

[56] References Cited

U.S. PATENT DOCUMENTS

| 3,519,352 | 7/1970 | Engborg | 356/43 |
| 3,630,085 | 12/1971 | Roney et al. | 73/355 EM |
| 3,884,075 | 5/1975 | Brandli et al. | 73/355 EM |
| 4,009,962 | 3/1977 | Lauer et al. | 250/341 |

*Primary Examiner*—Alfred E. Smith
*Assistant Examiner*—Janice A. Howell
*Attorney, Agent, or Firm*—Ostrolenk, Faber, Gerb & Soffen

[57] ABSTRACT

The measurement of the temperature of a body such as a wire, bar or tube, or a metal sheet, is effected in relation to a black background by providing either a swinging mirror or two flat mirrors and either a concave spherical mirror associated with the flat swinging mirror, or two concave spherical mirrors associated with the two flat mirrors, as well as an infrared radiation detector whose sensitive element receives alternately and successively, after reflection by the flat mirror(s) and collection by the spherical mirror(s), on the one hand, the infrared radiation of the wire and of the black background which surrounds it and, on the other hand, of the black background alone.

20 Claims, 17 Drawing Figures

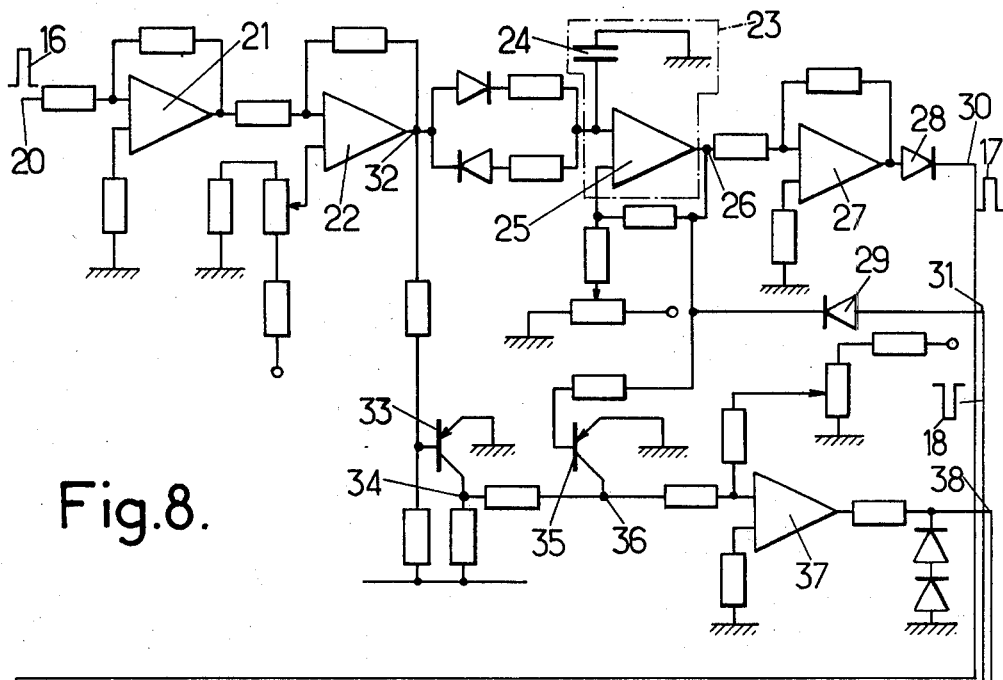
Fig.8.
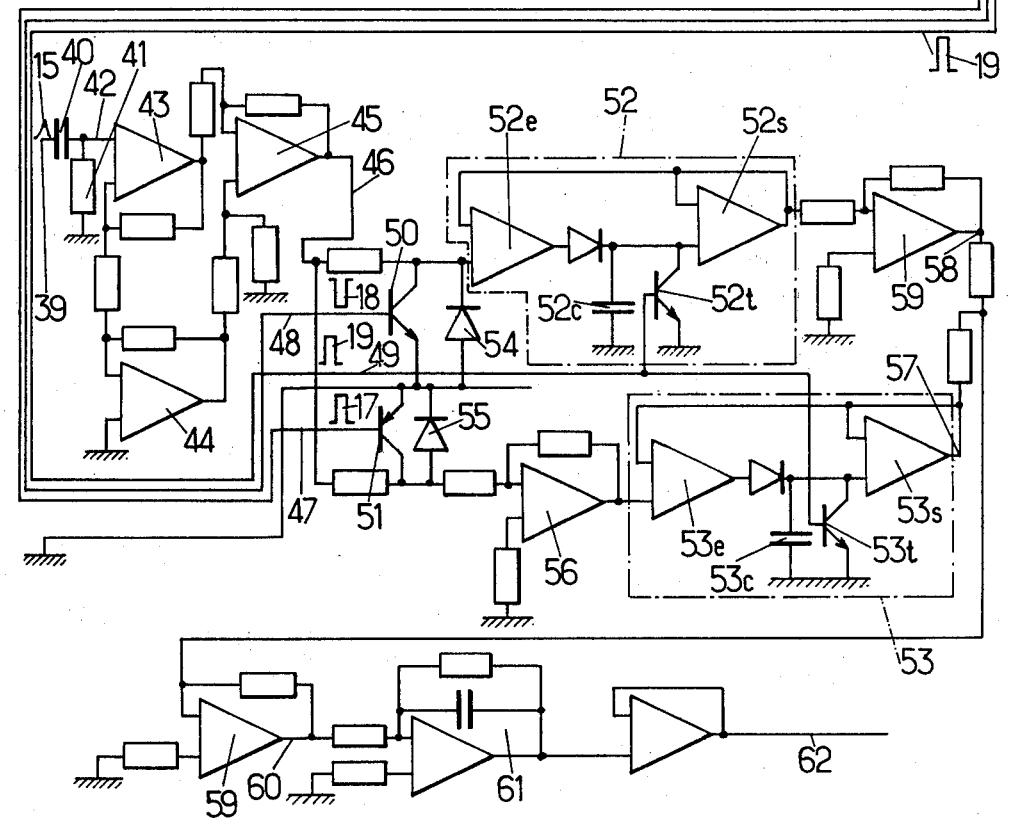

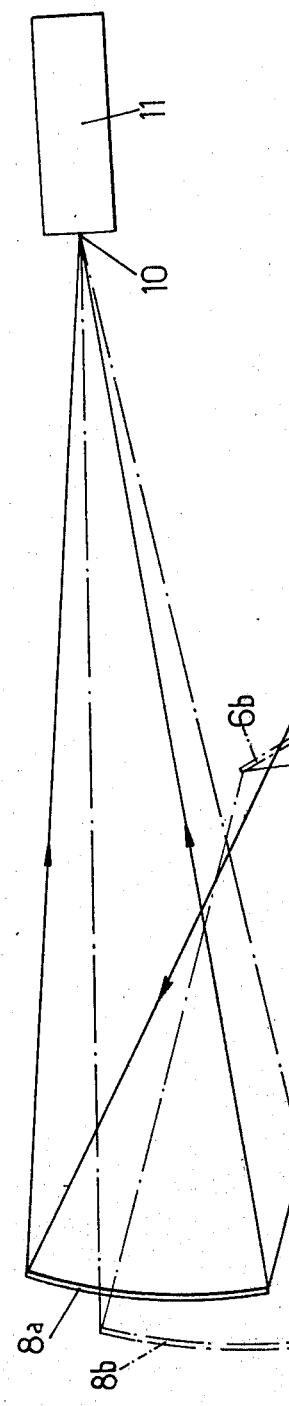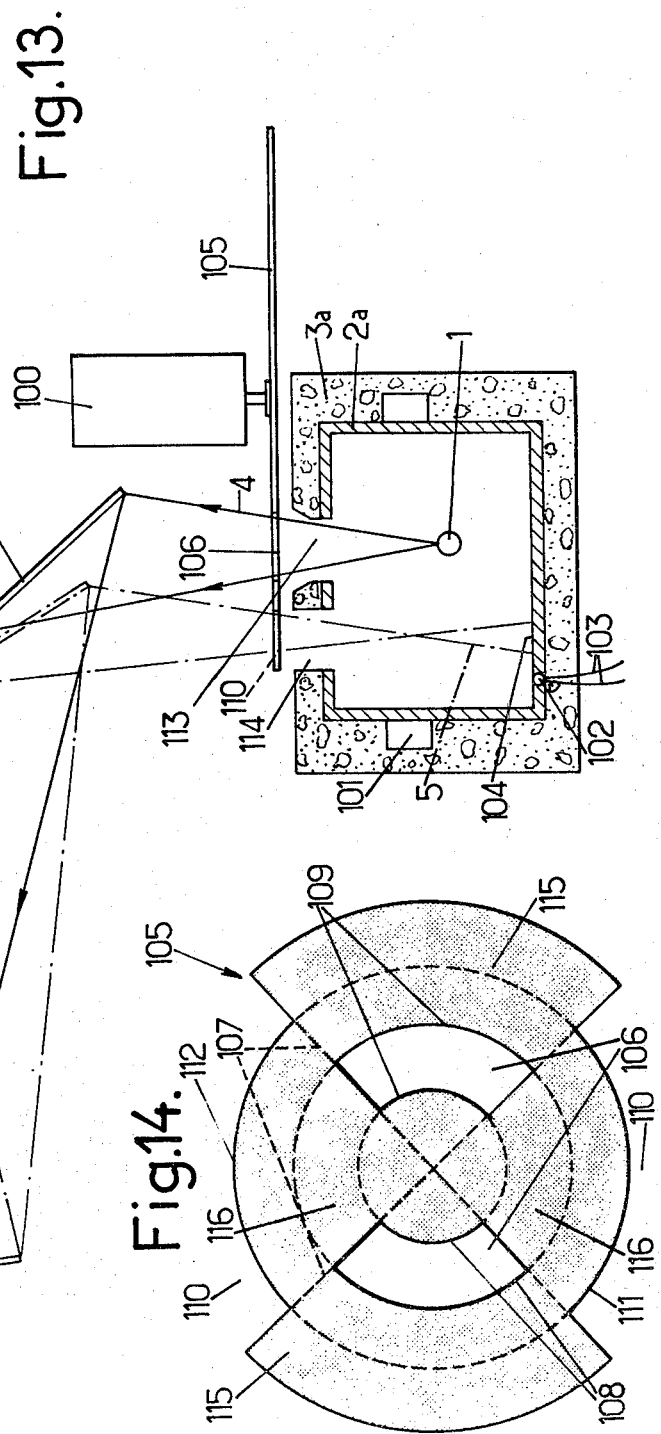
Fig.13.
Fig.14.

PROCESS AND DEVICE FOR MEASURING BY INFRARED THERMOMETRY THE TEMPERATURE OF A WIRE, BAR OR TUBE, OR A METAL

BACKGROUND OF THE INVENTION

The present invention concerns the application of infrared thermometry to the measurement of the temperature of wires, bars or tubes and metal sheets movable in the direction of their length (hereafter the word "wire" will be used to designate also bars and tubes).

It also applies to the control of this temperature using such a measurement.

French Pat. No. 2 109 406 filed on Oct. 15, 1970 by the Laboratoires d'Electronique et de Physique Appliquée (LEP) and the grant of which was published on May 26, 1972, describes a process and a device for measuring the temperature of wires, called long-limbed cylindrical bodies in the patent, moving in the direction of their length, in which the wire whose temperature it is desired to measure is caused to pass in front of a black background at a uniform temperature and a parallel beam emitted by the assembly of the black background and said wire is focused on the sensitive element of an infrared detector, the output signal of the detector being representative of the temperature of said wire and substantially independent of the movement of the wire in relation to the black background. The focusing is achieved by means of a flat swinging mirror and a lens transparent to the infrared.

Though the use of a parallel beam scanning the wire and the black background by means of the swinging mirror has the advantage of providing a measurement of the temperature independent of the position of the wire in relation to the black background, the device of French Pat. No. 2 109 406 has the disadvantage of limiting considerably the optical efficiency of the system since a very small proportion of the infrared rays, namely those which are substantially parallel to the optical axis of the system, are focused on the sensitive element of the detector and are then converted into a usable electrical signal, this signal being cancelled out moreover preferably when the temperature of the wire is identical to that of the black background by using a differential measurement between the emission of the black background alone and of the black background on which a fraction of the wire is superimposed.

The present invention aims at improving the process and the device of the above-mentioned patent by using a much larger fraction of the infrared rays coming from the wire and the black background. For this, instead of focusing by means of a lens solely the infrared rays substantially parallel to the optical axis reflected by at least one flat mirror, a much greater part of the infrared radiation emitted by the black background and the wire or an edge of the metal sheet, the temperature of which it is desired to measure, is collected for example by means of at least one concave spherical mirror.

The invention provides then a process for measuring, by infrared thermometry, the temperature of a wire or a metal sheet moving in the direction of its length in front of a black background at a constant temperature, according to which substantially the whole of the infrared radiation emitted by a portion of said wire, or said metal sheet, at a given solid angle is collected and applied to the sensitive element of an infrared detector during certain periods of time.

The invention also provides a device for implementing this process, this device comprising at least one flat swinging mirror, which reflects in a certain direction all the infrared radiation emitted by a portion of said wire or metal sheet and the black background within a given solid angle, and at least one concave spherical mirror which collects the infrared beam reflected by said flat swinging mirror and directs this beam thus collected on to said sensitive element.

It might be thought a priori that the fact of not being limited to the infrared rays substantially parallel to the optical axis emitted by the portion examined of the wire or metal sheet and the surrounding black background would increase the influence on the measurement of the movements of the wire or metal sheet. Now, it has been established however—and figures will be given in this connection in the detailed description which follows—that this influence is reduced if it is arranged for the wire or metal sheet to oscillate about a position of equilibrium and if means are provided for integrating the signal emitted by the infrared radiation detector so as to have a statistical response in which the fluctuations due to the movement of the wire or metal sheet are counterbalanced.

SUMMARY OF THE INVENTION

More particularly, the invention provides:

a process for measuring by infrared thermometry the temperature of a body having at least in one direction a small dimension, such as a wire or a metal sheet, even moving in the direction of its length in front of a black background, more particularly the difference between the temperature of this body and that of the black background, said process consisting in directing alternately and successively on to the sensitive element of an infrared detector, on the one hand, at least a part of the total infrared radiation emitted or reflected by a portion of the length of said body and emitted by a zone of the black background which surrounds said portion and, on the other hand, at least a corresponding part of the total infrared radiation emitted solely by said zone or an equivalent zone of said black background, without intervention by said body and in measuring the difference in intensity between these two parts by measuring the difference between the corresponding output signals of said sensitive element, said process consisting further in collecting on said sensitive element substantially the whole of the infrared radiation emitted or reflected in a given solid angle by said portion of said body and said zone of the background and, alternately and successively, substantially the whole of the infrared radiation emitted in the same solid angle solely by said zone or an equivalent zone, of said black background without intervention by said body;

a device for implementing the above process comprising—in combination with at least one flat mirror adapted to reflect alternately and successively, on the one hand, at least a part of the total infrared radiation emitted or reflected by a portion of the length of said body and emitted by a zone of the black background which surrounds said portion and, on the other hand, at least a corresponding part of the whole of the infrared radiation emitted solely by said zone or an equivalent zone of said black background, without intervention by said body and with means adapted to measure the difference in intensity between these two parts by measuring the difference between the corresponding output signals of said sensitive element—means for collecting on said sensitive element substantially the whole of the infrared radiation emitted or reflected in a given solid angle by said portion of said body and said zone of the background and, alternately and successively, substantially the whole of the infrared radiation emitted in the same solid angle solely by said zone or an equivalent zone of said black background, without intervention by said body.

In a first type of embodiment:

the process consists further in causing the whole of the infrared radiations to be reflected alternately and successively by means of a flat swinging mirror and these radiations are collected by means of a fixed concave spherical mirror;

the device is further characterized in that said at least one mirror is formed by a flat swinging mirror and in that said means for collecting the infrared radiations are formed by a concave spherical mirror.

In a second type of embodiment:

the process consists further in causing the infrared radiations to be reflected by at least two flat fixed mirrors and collecting the infrared radiations reflected by the flat mirrors by means of two concave spherical mirrors, each spherical mirror being associated with a flat mirror, and in interrupting alternately and successively, on the one hand, the total infrared radiation emitted or reflected by a portion of the length of said body and emitted by a zone of the black background which surrounds said portion and reflected by one of said fixed flat mirrors and by one of said concave mirrors and, on the other hand, the total infrared radiation emitted solely by said zone or an equivalent zone of said black background, without intervention by said body, and reflected by the other flat mirror and the other spherical mirror;

the device is further characterized in that said at least one flat mirror is formed by two fixed flat mirrors, in that said means for collecting the total infrared radiations are formed by two concave spherical mirrors, each concave spherical mirror being associated with a flat mirror, and in that means are provided for intercepting alternately and successively, on the one hand, the total infrared radiation emitted or reflected by a portion of the length of said body and emitted by a zone of the black background which surrounds said portion and reflected by one of said fixed flat mirrors and by one of said concave mirrors and, on the other hand, the total infrared radiation emitted solely by said zone or an equivalent zone of said background, without intervention by said body, and reflected by the other flat mirror and the other spherical mirror.

Since a great sensitivity of measurement should preferably be provided when the wire or metal sheet temperature to be measured is equal or close to that of the black background, it is recommended to reduce to a minimum the noise generated in said detector and the preamplifier into which this detector feeds.

To this end and in accordance with an additional feature of the invention used preferably at the same time as the main feature of the invention mentioned above, there is provided in the electronic part of the device into which said detector feeds means for making the voltage from the detector symmetrical in relation to the reference potential, means for providing positive or negative peak detection according as to whether the wire or metal sheet is respectively hotter or colder than the black background or conversely, means for detecting said positive and negative peak voltages and means for determining the algebraic sum of these positive and negative peak voltages thus detected.

The above and other objects, features and advantages of the present invention will become apparent from the following description given solely by way of non-limiting illustration when taken in conjunction with the accompanying drawings.

DESCRIPTION OF THE DRAWINGS

FIG. 8 shows the electronic part of this embodiment.

FIG. 13 shows schematically in partial section another embodiment of a device having improvements in accordance with the invention and being adapted especially to the measurement of the temperature of a tube or a bar.

FIG. 14 shows, seen from the top, the means for alternately and successively reflecting two infrared radiations on to the sensitive element in the embodiment of FIG. 13.

DESCRIPTION OF THE PREFERRED EMBODIMENTS

According to the invention, desiring to carry out a process and construct a device for measuring by infrared thermometry the temperature of a wire or a metal sheet, the following or similar is the way to set about it.

In what follows the description will generally be limited to the case of a wire, but it should be understood that the explanations which follow also apply to the case of a metal sheet and also (particularly for FIGS. 13 to 17) to the case of a tube or a bar.

Figure 1:
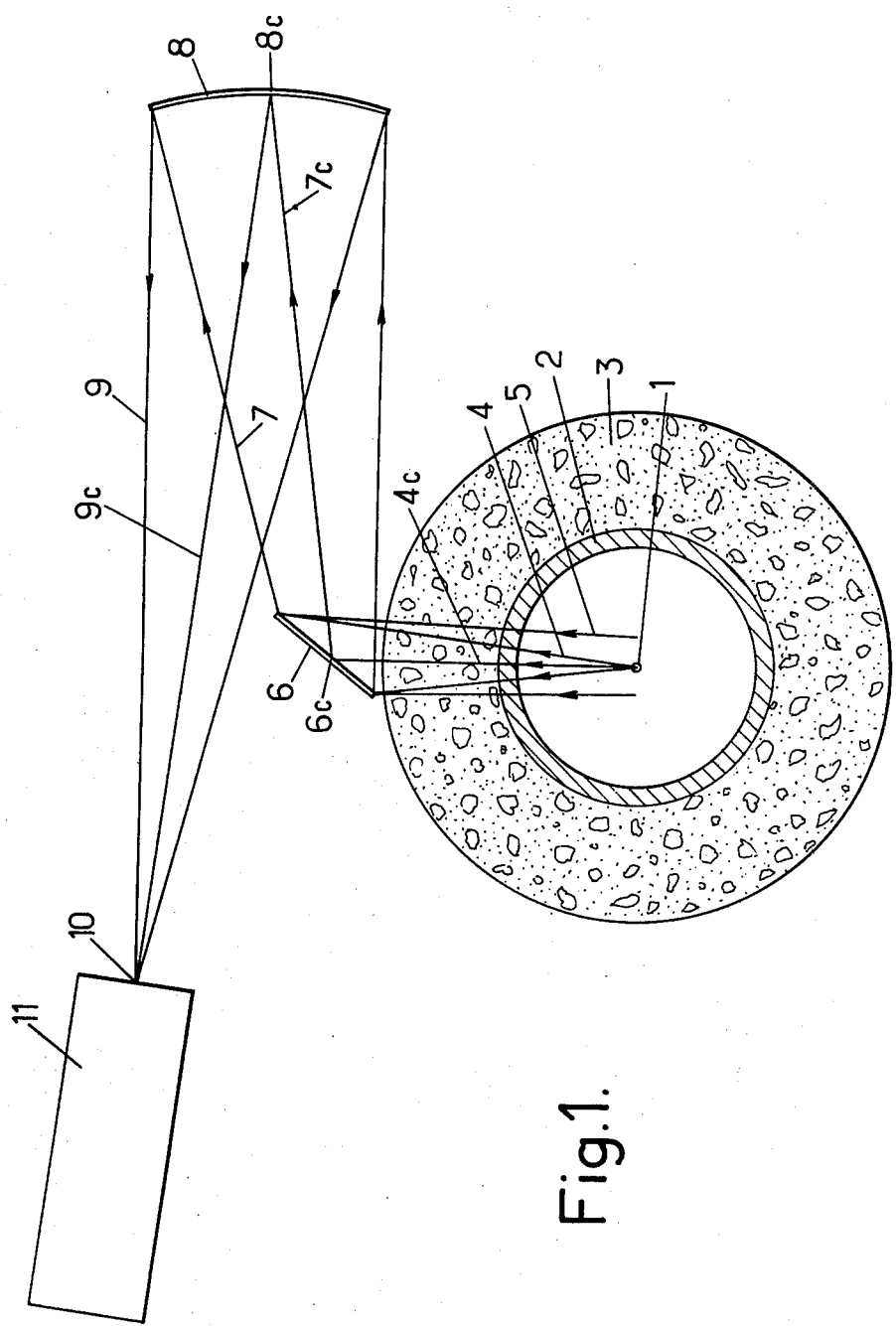
FIG. 1 shows schematically in partial section the whole of one embodiment of the device of the invention for measuring the temperature of a wire, with the exception of the electronic part.

Reference is made first of all to FIG. 1 in which for the sake of simplicity the opening through which the infrared radiation passes has not been shown. In this Fig. there is shown at 1 the wire whose temperature it is desired to determine and which is surrounded by a body or a black background 2 formed for example by a tube made from graphite or from a material obtained by so-called "pyrox" fritting having a high emissive power. A cylindrical insulating jacket 3 made from glass fiber surrounds body 2. The whole of the infrared rays emitted by wire 1 and of the infrared rays 5 emitted by the black body are reflected during certain periods of time by a swinging flat mirror 6 as ray 7 on to a mirror 8.

In accordance with the main feature of the invention, this is a concave spherical mirror which collects finally, after reflection by swinging mirror 6 (when it is in the position shown in FIG. 1) the whole of the rays emitted by wire 1 and the region of the black body which surrounds it and not only the rays substantially parallel to the optical axis which corresponds to axial ray 4c which is reflected at 7c by swinging mirror 6 in the position occupied by this latter shown in FIG. 1.

Spherical mirror 8 reflects rays 7, as rays 9, on to the sensitive element 10 of infrared radiation detector 11. It will be noted that axial ray 7c is reflected by mirror 8, as axial ray 9c, and that spherical mirror 8 has its axis offset in relation to the axis of infrared radiation 7c; it is then an "off axis" spherical mirror.

The advantage of the system which has just been described with reference to FIG. 1 is that it is very efficient if compared with that of a system using only the infrared rays emitted by wire 1 and the surrounding black background in a direction substantially parallel to the optical axis 4c. This may be shown in the case of a particular example of an embodiment corresponding to FIG. 1. In this embodiment, the spherical mirror may have a radius of 75 mm, an opening whose diameter is 40 mm and a magnification of 1, the distance between the wire and the swinging mirror being 53 mm, whereas the distance between the centre 6c of the swinging mirror and the centre 8c of the spherical mirror is 97 mm. The slope of the mean ray in relation to the axis of the mirror is 7° and the solid angle at which the wire is seen is equal to $5.56 \times 10^{-2}$ steradian.

By taking as window for detector 11, i.e. for the sensitive element, a square surface with a side of 2 mm, it is a 2 mm portion of the length of the wire (in the direction perpendicular to the plane of FIG. 1) which appears on the sensitive surface. Assuming that the wire has a diameter of 1 mm, the ratio between the surface of the wire and the surface of the black background, seen by the detector, is 50%.

On the contrary, in the case of the device described in the above-mentioned French Pat. No. 2,109 406, it is the surface internal to a circle of 23 mm which is scanned, this surface being determined by two diaphragms which limit and make more constant the length of wire concerned (which would otherwise be variable, which would falsify the measurements). In this case the ratio between the surface of the wire and the surface of the black background is no more than 4.35% (instead of 50% in the case of the embodiment of the accompanying FIG. 1), which corresponds to a very low optical efficiency, resulting from using only rays parallel to the optical axis.

On the other hand, as pointed out in the preamble, the system of FIG. 1 presents in principle the disadvantages of being sensitive to the position of the wire in the direction of the depth (i.e. when the distance from the wire to mirror 6 and so to mirror 8 varies). However, calculation shows that a deviation of 5 mm forwards or backwards leads to a relative variation of wire surface 1 scanned by detector 11 less than 2%, which then causes a variation in the infrared flux and so in the electric signal supplied by detector 1 of the same order. Also as pointed out in the preamble, the disadvantages of this variation are reduced because the wire oscillates about a position of equilibrium and because the electronic means which follow detector 11 (as explained above) supply a statistical response which eliminates the fluctuations by means of an integrator circuit. It is in fact the mean position of wire 1 in relation to black background 2 which is important.

Figure 11:
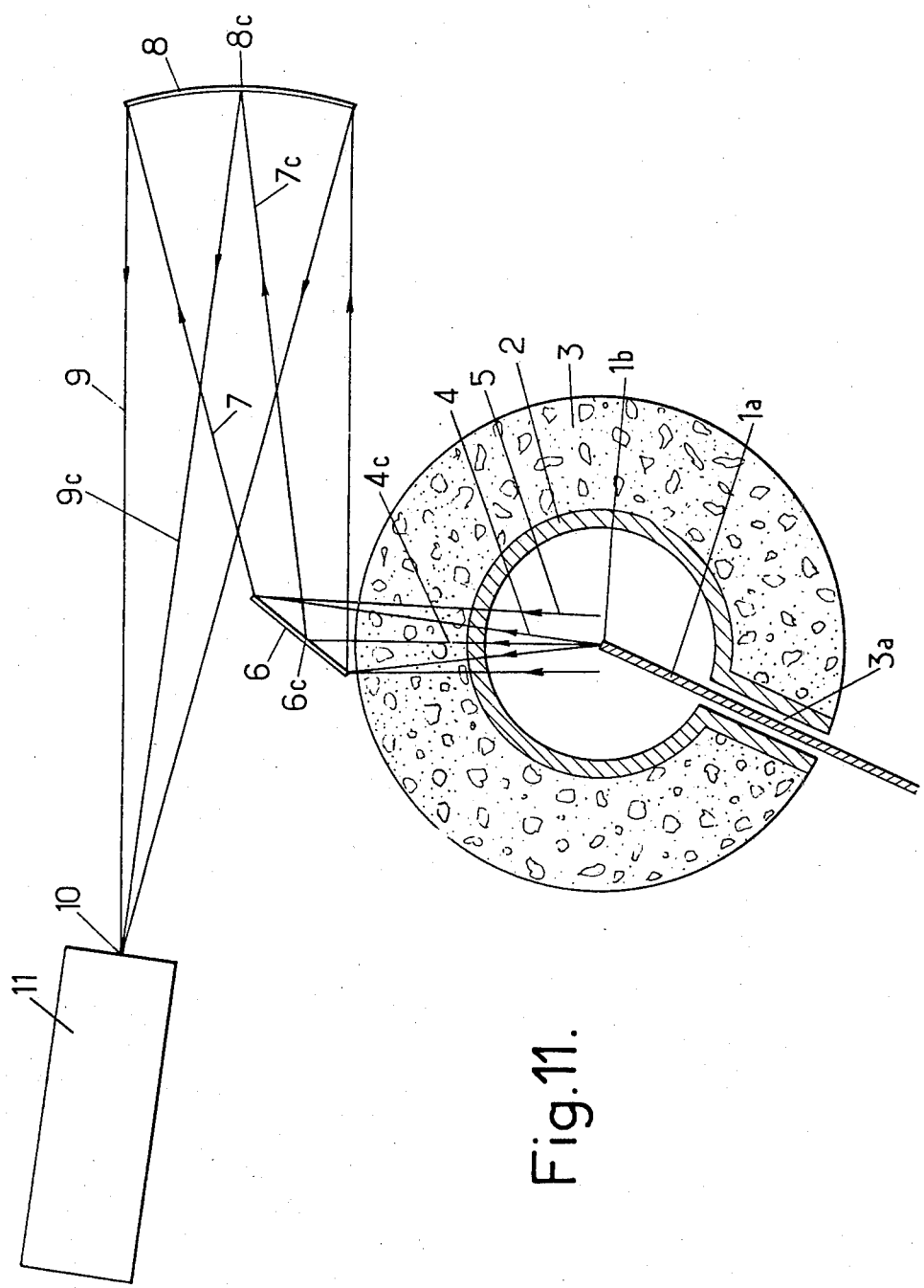
FIG. 11 is similar to FIG. 1 but it concerns the measurement of the temperature of a metal sheet.

Reference is now made to FIG. 11 (in which are to be found the references of FIG. 1) where there is shown at 1a the metal sheet which moves through a narrow slot 3a machined in black body 2 and in cylindrical jacket 3. The whole of the infrared rays 4 emitted by the edge 1b of metal sheet 1a as in the case of the wire, with the infrared rays emitted by black body 2, are reflected during certain periods of time by swinging mirror 6 as ray 7 on to spherical mirror 8. The plane of metal sheet 1a forms an angle with the axial ray 4c so as to prevent external rays, passing through slot 3a, from reaching sensitive element 10.

Up to now, it has not been pointed out why mirror 6 was a swinging mirror. Mirror 6 is caused to swing so as to send to detector 10 alternately an infrared flux which comprises rays 4 emitted by wire 1 at the same time as rays 5 emitted by the black background, on the one hand, and solely rays 5 emitted by the black background, on the other hand. It will then be readily understood that if the difference is taken between the first radiation, on the one hand, and the second radiation, on the other hand, a signal is obtained which is equal to zero when wire 1 is at the same temperature as black body 2 and which is positive or negative according as the temperature of wire 1 is higher or lower that that of black background 2 (according to the polarity, such a response or even the reverse response may be obtained depending on the temperature difference between wire 1 and black body 2).

Figure 12:
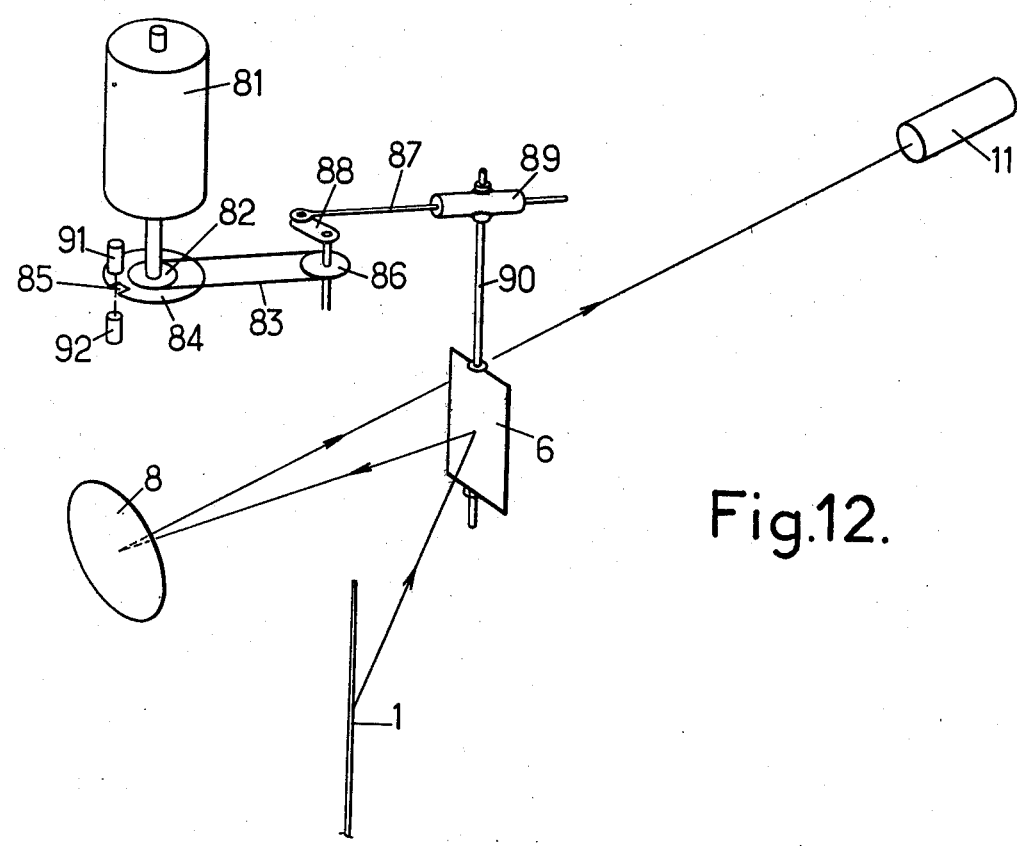
FIG. 12 illustrates the mechanical portion of the device of FIGS. 1 and 11.

In FIG. 12 there is shown schematically the mechanical device for causing flat mirror 6 to swing at the same time as the synchronizing signal. A motor and stepdown gear 81 drives at the same time a pulley 82 with its notched belt 83 and a disk 84 havig a slot 85. Notched belt 83 drives another pulley 86 integral with a cranked arm 88 and link 87 system, of which the link 87 slides in a sleeve 89 rotatable about a shaft 90 fixed in space. This shaft 90 is integral with flat mirror 6, which swings due to the movement of link 87 with an amplitude adjustable by modifying the length of the crank-arm 88. In FIG. 12 are to be found elements 1, 8 and 11 of FIG. 1. Disk 84 with the slot 85 passes under an optoelectronic detector 91 which detects the passing of slot 85 by means of a light source 92 whose rays then reach detector 91. By changing the angular position of slotted disk 84 in relation to drive pulley 82 the position of the synchronous detection is modified.

So it can be seen that the electronic part which is not illustrated in FIG. 1 must provide a great sensitivity in the measurement about the detection of zero, when wire 1 and black background 2 are at the same temperature. The result is then that the noise emitted by detector 11 and that emitted by the pre-amplifier into which the detector feeds and which may be incorporated in the detector or placed thereagainst, in a known way, assumes a very great importance.

In accordance with a feature of the invention means are provided for making the voltage from detector 11 symmetrical in relation to the reference potential, and this particularly by means of a high impedance capacitive connection. Then the positive peak and the negative peak are detected, one corresponding to the case where the wire is hotter than the black background and the other to the opposite case, then the positive and negative voltages about the "zero detection" are detected and finally the algebraic sum of the positive and negative peak voltages is made.

In FIGS. 2 to 7 are illustrated the different corresponding signals.

Figure 2:
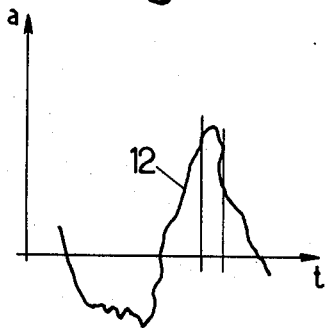
FIGS. 2 to 7 illustrate the electric signals used in this embodiment.

Thus a detected positive voltage 12 is obtained which is illustrated in FIG. 2 in which the amplitude a is shown as ordinate and the time t as abscissa.

Figure 4:
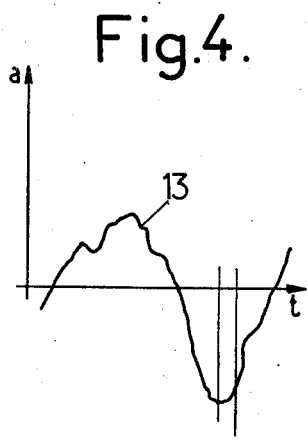

In FIG. 4 is shown the negative voltage detected 13 using the same ordinate a and abscissa t.

Figure 6:
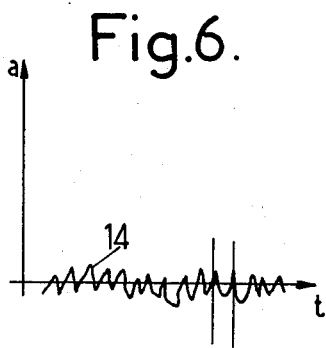

In FIG. 6 there is shown with the same ordinate a and abscissa t the signal 14 detected about zero and it can be seen that very good sensitivity is obtained which is for example of the order of 0.5° C. for a black background temperature of the order of 70° C., which means that variations of half a degree of the temperature of the wire above or below the temperature of the black body may be detected when this latter is of the order of 70° C.

Figure 3:
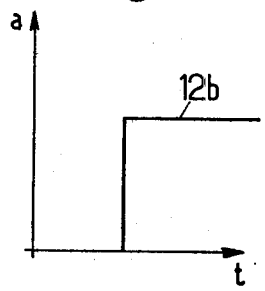
Figure 5:
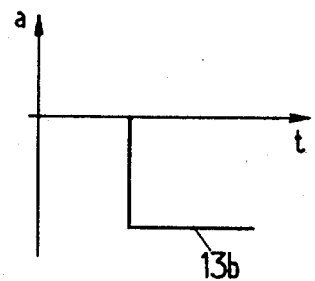
Figure 7:
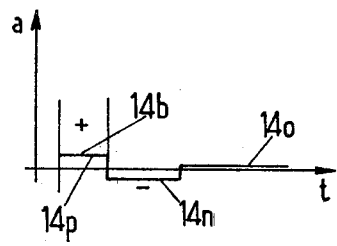

FIGS. 3, 5 and 7 illustrate with the same ordinate a and abscissa t the positive voltages 12b, the negative voltages 13b and the algebraic sum 14b corresponding to signals 12, 13 and 14 respectively, after storage. In FIG. 7 can be seen in particular the positive part 14p, the negative part 14n and the part 14o, which constitutes the algebraic sum of the positive part 14p and the negative part 14n of the integrated signal in the case where the temperature of the wire is respectively higher than, lower than or substantially equal to that of the black background.

With reference to FIG. 8 for the electronic circuit and to FIGS. 9 and 10 for the signals, there will now be described the circuit of the electronic part according to a preferred embodiment of the invention.

Figure 9:
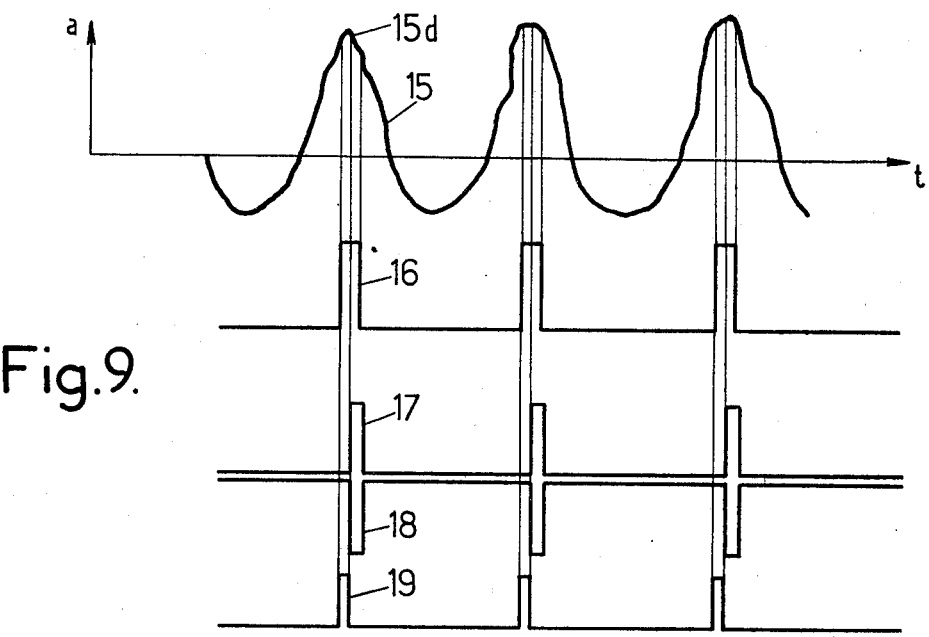
FIGS. 9 and 10 illustrate electric signals used in the circuit of FIG. 8.

We will begin first of all by describing FIG. 9 so as to be able to better follow the functions of the components of the device of FIG. 8.

In FIG. 9 there is first of all illustrated signal 15 which is the output signal of detector 11 and which represents then, in the system of coordinates a and t, the difference between the temperature of wire 1 and the temperature of black body 2.

In synchronism with the swinging of mirror 6 disk 84 with slot 85 (FIG. 12) rotates, which, when this slot lets the light beam from source 92 pass towards photoelectronic detector 91, supplies an electric pulse 16 which is synchronized with signal 15. That means that to each peak 15d of signal 15 there corresponds a pulse 16. By means which will be described hereafter with reference to FIG. 8, there is obtained from each pulse 16 two symmetrical pulses 17 and 18, one positive and the other negative, of a given width (less than that of a pulse 16) and whose leading edges are delayed in relation to the leading edge of the corresponding pulse 16. Furthermore, still from pulse train 16 there is obtained a train of pulses 19 each of which precedes the corresponding pair of pulses 17, 18.

Reference is now made to FIG. 8 showing the general electronic diagram. The output signal of the photoelectric detector which receives the light beam passing through the slot of said disk, i.e. the succession of pulses 16, is applied to the input 20 of the circuit of FIG. 8. Pulses 16 are amplified by two operational amplifiers 21, 22 mounted in cascade; these pulses, available at output 32, are delayed by circuit 23 comprising a capacitor 24 and an operational amplifier 25, said capacitor 24 causing these pulses to be staggered between the input and the output of circuit 23 through a phase-shift effect. The output 26 of circuit 23 is connected, on the one hand, through operatonal amplifier 27 connected as an inverter, to forward connected diode 28 and, on the other hand, directly to reverse connected diode 29. Thus there is obtained at output 30 the train of positive pulses 17 and at the output 31 the succession of negative pulses 18 (symmetrical with pulses 17), these pairs of pulses 17, 18 being delayed (because of capacitor 24) in relation to the input pulses 16.

Furthermore, the output pulses from amplifier 22, taken at 32, are applied to the base of a transistor 33 of the PNP type; there is obtained at the collector of this transistor 33 a negative voltage when this transistor is disabled, i.e. when its base is made negative by output 32. So there is obtained at the collector of transistor 33, at 34, a negative pulse for each positive pulse 16. The duration of the pulses appearing at 34 is reduced by transistor 35 due to the connection of the base of transistor 35 to the output 26 of circuit 23. When output 26 provides a pulse (which will become a pair of positive 17 and negative 18 pulses), there appears a negative voltage which enables transistor 35 and so puts the collector of this transistor to ground which suppresses the portion of the pulse available at 34 during the duration of pulses 17 and 18. This appears clearly in FIG. 9 in which it can be seen that pulse 19 corresponds to the part of pulse 16 which does not correspond to the pair of pulses 17, 18. In fact, at 36 we do not have positive pulses, as shown in FIG. 9, but negative pulses, as previously shown, and it is the operational amplifier 37 which effects an inversion of polarity because of its mounting, pulses 19 being effectively available at 38.

It can then be seen that the upper half of the circuit of FIG. 8 enables the successions of pulses 18 and 19 to be obtained respectively at 30, 31 and 38 from the succession of pulses 16 applied to input 20.

In the lower half of FIG. 8, the output of the infrared detector 11, i.e. signal 15d, is applied to input 39. The assembly formed by capacitor 40 and resistor 41 forms a high impedance input which results in signal 15 being made symmetrical in relation to ground while distorting it as little as possible. The symmetrical signal available at 42 is applied to an instrumental amplifier, having a very high impedance input, formed by operational amplifiers 43, 44 and 45. At the output, at 46, a signal is obtained which will now be processed as will be described hereafter with use of pulses 17, 18 and 19 available at 47, 48 and 49 respectively.

Transistors 50 and 51 are always enabled, except at the moment when pulses 18 (arriving at 48) and 17 (arriving at 47) are applied to their base. Thus, modified signal 15 arriving at 46 is stopped by these transistors 50 and 51 except during the duration of pulses 17 and 18. The circuit then comprises two blocking circuits 52 and 53 each comprising two operational amplifiers of which the input operational amplifier 52e, 53e amplifies in current the input pulse so as to charge capacitors 52c, 53c respectively, whereas the output operational amplifier 52s and 53s takes from capacitor 52c or 53c respectively a very low current in order to supply a DC output voltage equal to the input pulse voltage.

Blocking circuits 52 and 53 are fed respectively by the positive and negative parts of signal 46 through diodes 54 and 55: the positive parts pass into blocking circuit 52, whereas the negative parts, after inversion of polarity in operational amplifier 56, pass into blocking circuit 53. The result is that the signal stored in capacitors 52c and 53c is always positive.

The information finally leaves blocking circuits 52 and 53 in the form of a DC voltage and is used either directly at 57, or at 58, after inversion in operational amplifier 59. The positive signal available at 57 and the negative signal available at 58 are added and applied to operational amplifier 59.

Capacitors 52c and 53c must of course have been previously discharged and this is achieved by means of pulses 19 available at 49 and which are applied to the bases of transistors 52t and 53t of blocking circuits 52 and 53 respectively; when these transistors 18 and 19 are enabled by pulses 19, the corresponding capacitors 52c and 53c discharge to ground through the emitter-collector circuits of these transistors.

Consequently if there appears at 39, and so at 46, a positive voltage during a pulse 18, playing the role of a window, it is stored positive in capacitor 52c and it will appear in the form of a negative DC voltage at the output 60 of the mixer operational amplifier 59; on the other hand if there appears at 39, and so at 46, a negative voltage during pulse 17, also playing the role of a window, it is stored positive in capacitor 53c and appears in the form of a negative DC voltage at output 60; finally, if there appears at 39, and so at 46, a voltage both positive and negative (this is the case of noise), this voltage will be stored both in capacitor 52 and in capacitor 53c and will appear at 60 in the form of the difference between these negative and positive voltages, this difference itself being either positive or negative.

In short it can be seen that the succession of signals 16 which is generated by the window of the disk not shown, in synchronism with signal 15 of the detector, serves to produce pulses 19, forming windows, which discharge capacitors 52c and 53c; after this discharge, windows 17 and 18 allow signal 15 previously processed to be stored in these same capacitors and a DC voltage to appear at output 60. This voltage is positive or negative, depending on the polarity of signal 15 and so depending on whether wire 1 is hotter or colder than background 2, it being understood that the amplitude of this DC voltage varies in the same direction as the temperature difference. We have seen moreover that the influence of noise tends to be eliminated. The positive or negative DC voltage appearing at 60 is renewed with each group of pulses 18 and 19, the rate being for example ten repetitions per second.

It should be noted that this DC signal may come from a small positive or negative zone of the signal of the infrared detector or from the algebraic sum of two positive and negative zones, if the noise produces an amplitude information covering the zero axis of ground. This arrangement provides great sharpness of response in the most interesting zone, that where the temperature of the wire is close to that of the black body.

The voltage available at 60 then passes into a low-pass filter 61 so as to eliminate certain random and rapid variations, the time constant of these filters being possibly of the order of 0.5 second. It is finally at 62 that a positive and negative DC voltage is obtained which is the signal representative of the difference between the temperature of the wire and that of the black background.

Figure 10:
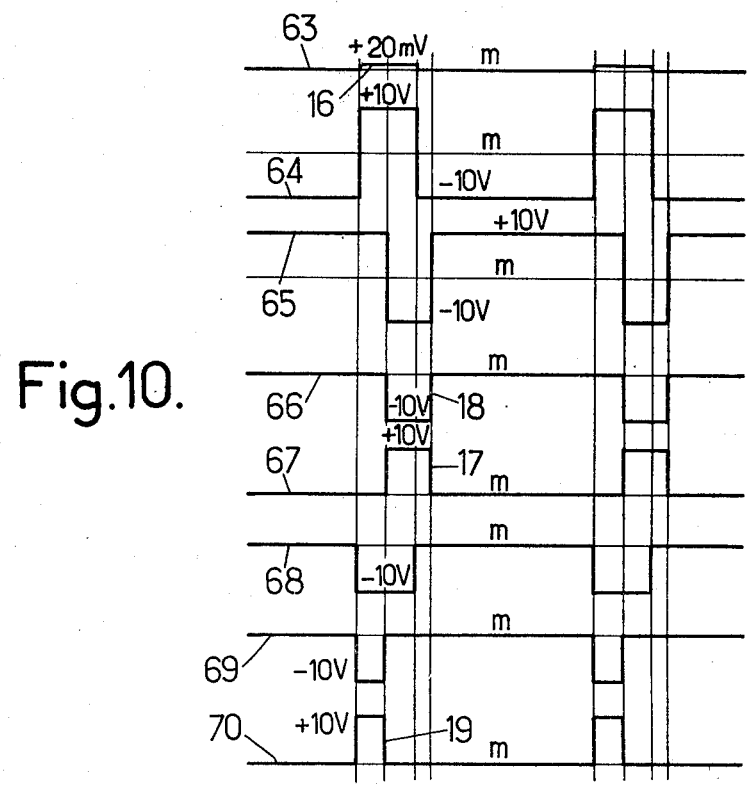

In FIG. 10, finally, different signals are shown, on an enlarged scale and with indication (in volts V or millivolts mV) of polarities given by way of example (the ground potential being shown by the level m), namely:
signal 63 which leaves the photoelectric detector cooperating with the slotted disk which is actuated in synchronism with the swinging mirror 6 to constitute a synchronisation device, this signal 63 comprising pulses 16 of FIG. 9, which arrive at 20 (FIG. 8),
signal 64 available at 32,
signal 65 available at 26,
signal 66, with pulses 18, available at 31 and 48,
signal 67, with pulses 17, available at 30 and 47,
signal 68 available at 34,
signal 69 available at 36,
and finally signal 70, with pulses 19, available at 38 and 49.

It can be seen that the embodiments described enable very accurate measurements to be made of the temperature of a wire or metal sheet in relation to a black background at constant temperature, even when this wire or metal sheet oscillates in front of the black background and even when the difference of temperature is very small, e.g. less than 1°, between the wire and the black background.

However, the use of a swinging mirror presents a number of disadvantages:
the adjustment of the sighting axis must be very accurate,
transverse movement of the body produces variations in the frequency of the output signal of the sensitive element,
the ratio between the size of the optical sighting window and the distance between this window and the body must be maintained small and so the size of the black background needs to be increased when the diameter of the body seen by the flat mirror increases,
sensitivity diminishes if the above diameter is reduced.

This results then in problems when the diameter of the body is too great or too small and/or when this body is subjected to transverse movements in relation to the black background.

To avoid these disadvantages, a device may be constructed in accordance with the invention by causing the infrared radiation to be reflected, not by means of a single flat swinging mirror, but with two fixed flat mirrors and by causing the infrared radiations to be collected not by means of a single concave spherical mirror but with two concave spherical mirrors, each spherical mirror being associated with a flat mirror, in combination with means for intercepting alternately and successively, on the one hand, the total infrared radiation emitted or reflected by a portion of the length of said body and emitted by a zone of the black background which surrounds said portion and reflected by one of said fixed flat mirrors and by one of said concave mirrors and, on the other hand, the total infrared radiation emitted solely by said zone, or an equivalent zone, of said black background, without intervention by said body and reflected by the other flat mirror and the other spherical mirror.

The scanning of the radiation emitted, on the one hand, by the elongated body (particularly a wire, bar or tube in the embodiment illustrated) and, on the other hand, by the black background is then achieved (FIGS. 13 to 17) no longer by means of one flat swinging mirror and one concave spherical mirror (as in the embodiments of FIGS. 1 to 11), but by using two fixed sightings each using a fixed flat mirror and a concave spherical mirror, disposed so that the parts used of the radiation emitted not only by the wire, bar or tube, but also by the black background, are reflected by the flat mirror and collected by the concave mirror of each sighting towards the same sensitive zone of the detector, and this at the same angle, means being provided for stopping alternatively and successively the radiations forming each of the two sightings.

This embodiment applies particularly to the measurement of the temperature of bars or tubes.

More particularly, referring to FIG. 13, the infrared radiation 4 of body 1 is reflected by a fixed flat mirror 6a on to a concave spherical mirror 8a which collects all the infrared radiation reflected by flat mirror 6a and concentrates it at the sensitive zone 10 of a detector 11.

Black background 2a is formed in the embodiment illustrated by copper plates covered with colloidal graphite having a high emissive power, copper having the advantage of having good thermal conductibility. This black background is heated by electrical resistances 101 embedded in a cylindrical insulating jacket 3a (made from glass fibers for example). A temperature detector 102 (such as a resistance probe or a thermoelectric couple), whose output wires are shown at 103, enables the temperature of resistances 101 and so of black body 2a to be regulated by means of a thermostat (not shown).

In this embodiment, black background 2a has been given a rectangular section so as to facilitate construction thereof and to achieve the sighting of a portion 104 of the black background on a flat surface and so at a constant angle.

The sighting of portion or zone 104 is achieved by means of a flat mirror 6b which reflects the infrared radiation 5 emitted by this zone 104 on to a concave spherical mirror 8b which collects all the infrared radiation reflected by mirror 6b and coming from zone 104 on the same sensitive zone 10 of detector 11, the radiations coming from concave mirrors 8a and 8b reach sensitive zone 10 at the same angle. It is also arranged for the optical path to be the same for the infra-red radiation from zone 104 and for the infrared radiation from wire 1.

Such an arrangement leads to a double shift of the optical axis, one shift being regulated by flat mirrors 6a and 6b and the other by concave mirrors 8a and 8b.

Figure 15:
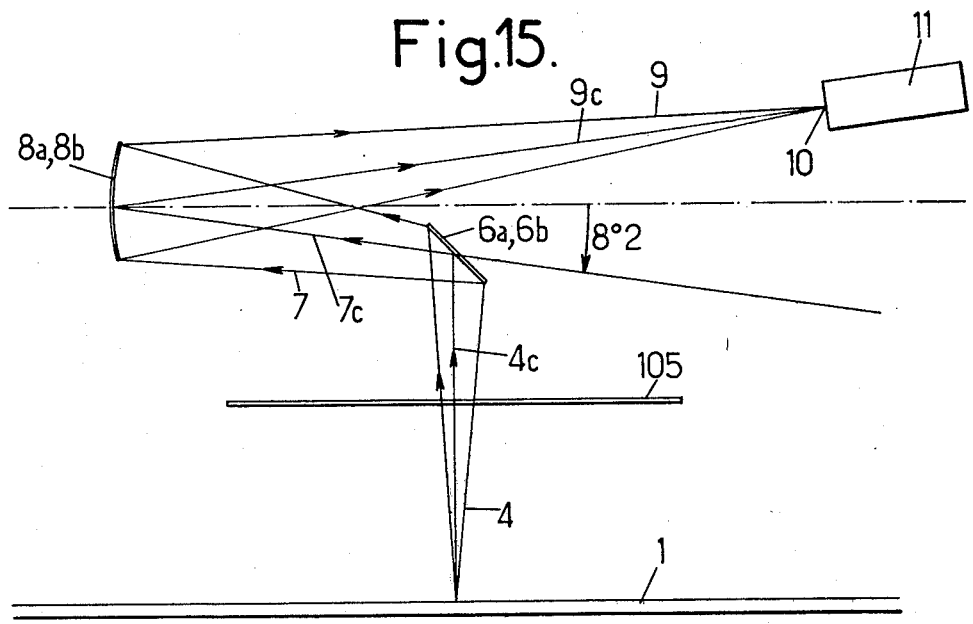
FIGS. 15 and 16 show in two planes perpendicular to each other the optical means used in the device of FIG. 13.
Figure 16:
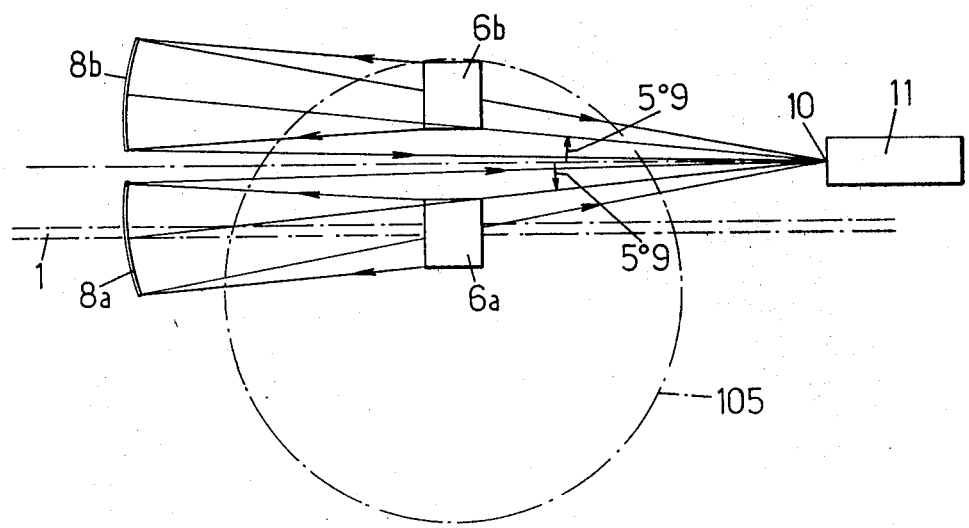

Referring now also to FIGS. 15 and 16, corresponding respectively for example to a view in a vertical plane (from the front) and a view in a horizontal plane (from the top) respectively, it can be seen that if the sighting on wire 1 is effected vertically, flat mirrors 6a and 6b control the shift of the infrared rays in a vertical plane, whereas concave mirrors 8a and 8b provide this shift in the horizontal plane. In a particular non limiting example, mirrors 8a and 8b are spherical mirrors having a focal length of 110 mm and an aperture of 40 mm, the distance between wire 1 and the centre of flat mirror 6a being 110 mm and the distance between the centres of flat mirror 6a and spherical mirror 8a being also 110 mm.

In FIG. 14 there are shown the references for radiations 7 and 9 reflected by the flat mirrors, on the one hand, and the spherical mirrors, on the other, as well as the central rays 4c, 7c and 9c corresponding to radiations 4, 7 and 9, namely the same references as in FIGS. 1 and 11.

The slope in the vertical plane which is controlled by flat mirrors 6a and 6b is then 8°2, whereas the slope in the horizontal plane which is controlled by spherical mirrors 8a and 8b is 5°9 for both mirrors. Finally the solid angle at which wire 1 is seen is $6.28 \times 10^{-4}$ steradian.

In FIGS. 15 and 16 are shown the angles of slope in the vertical plane and in the horizontal plane.

The device which has just been described comprises means illustrated in FIGS. 13 and 14 for stopping alternately and successively the infrared radiation 4 from wire 1 and the infrared radiation 5 from the black background. By way of example these means are formed by a disk 105 illustrated in a plane view in FIG. 14, which is rotated at constant speed by a motor 100.

This disk comprises:
  on the one hand, two apertures 106 limited by two orthogonal diameters 107 and by four quarters of a circle 108 and 109;
  on the other hand two recesses 110 also limited by the orthogonal diameters 107 and by two quarters of a circle 111 and 112.

Apertures 106 cooperate with the window 113 provided in black body 2a and the insulating jacket 3a so as to let through, when one of them is at the level of this window 113, the infrared radiation 4 emitted by the body or wire 1 towards flat mirror 6a and so towards sensitive element 10 of detector 11 after collection by concave mirror 8a.

Similarly the apertures or recesses 110 cooperate with a similar window 114 through which passes the infrared radiation 5 emitted by zone 104 to let this radiation through towards flat mirror 6a then towards concave collecting mirror 8b so that it reaches the sensitive element 10 when one of these recesses is opposite window 114.

Because of windows 113 and 114 and apertures 106 and 110 which follow each other alternately (because they are limited by the same diameters 107), it can be seen that sensitive element 10 receives alternately and successively and at the same angle the infrared radiations from wire 1 and from the black body (zone 104) after they have been reflected by flat mirrors 6a and 6b and collected by concave mirrors 8a and 8b.

Detector 11 is advantageously a pyroelectric detector sensitive to all the infrared radiation emitted by the wire or other body 1 and the black background (zone 104) at all temperatures, particularly for example around 150° C.

The final detection, in the embodiment having two fixed flat mirrors and two concave spherical mirrors, is achieved for example as above with reference to FIGS. 2 to 10, i.e. by synchronous detection. Since the frequency of the radiation is stable, for the sightings are fixed without using a swinging mirror, an excellent synchronous detection may be obtained.

It will be noted that with the device of FIGS. 13 to 17 the same electronic system may be used as with the devices of FIGS. 1, 11 and 12, for the following reasons:
  in the system with a swinging mirror (FIG. 1, 11 and 12), we pass progressively because of the swinging of the mirror from sighting the wire to that of the black background and conversely;
  in the device with two pairs of fixed mirrors (FIGS. 13 to 17) we go progressively from sighting the wire to that of the black background and conversely for, when apertures 106 progressively uncover window 113, the opaque zones 115 progressively replace apertures 110; for this reason the radiation from body 1 progressively replaces the radiation from zone 104 on the sensitive element 10 of the detector; going over from one radiation to the other is then gradual; similarly, when apertures 110 are substituted for opaque zones 115 in front of window 114, the infrared radiation from zone 104 is progressively substituted for the infrared radiation from wire 1 on the sensitive zone 10 of detector 11.

It will be noted that this sensitive zone 10 also receives the radiation reflected by the opaque zones 115 and 116. So as not to disturb the measurement it is necessary for these zones to be at the same temperature and for this purpose disk 105 is made from a heat conducting material so that its temperature is uniform. Disk 105 may for example be made from copper.

Figure 17:
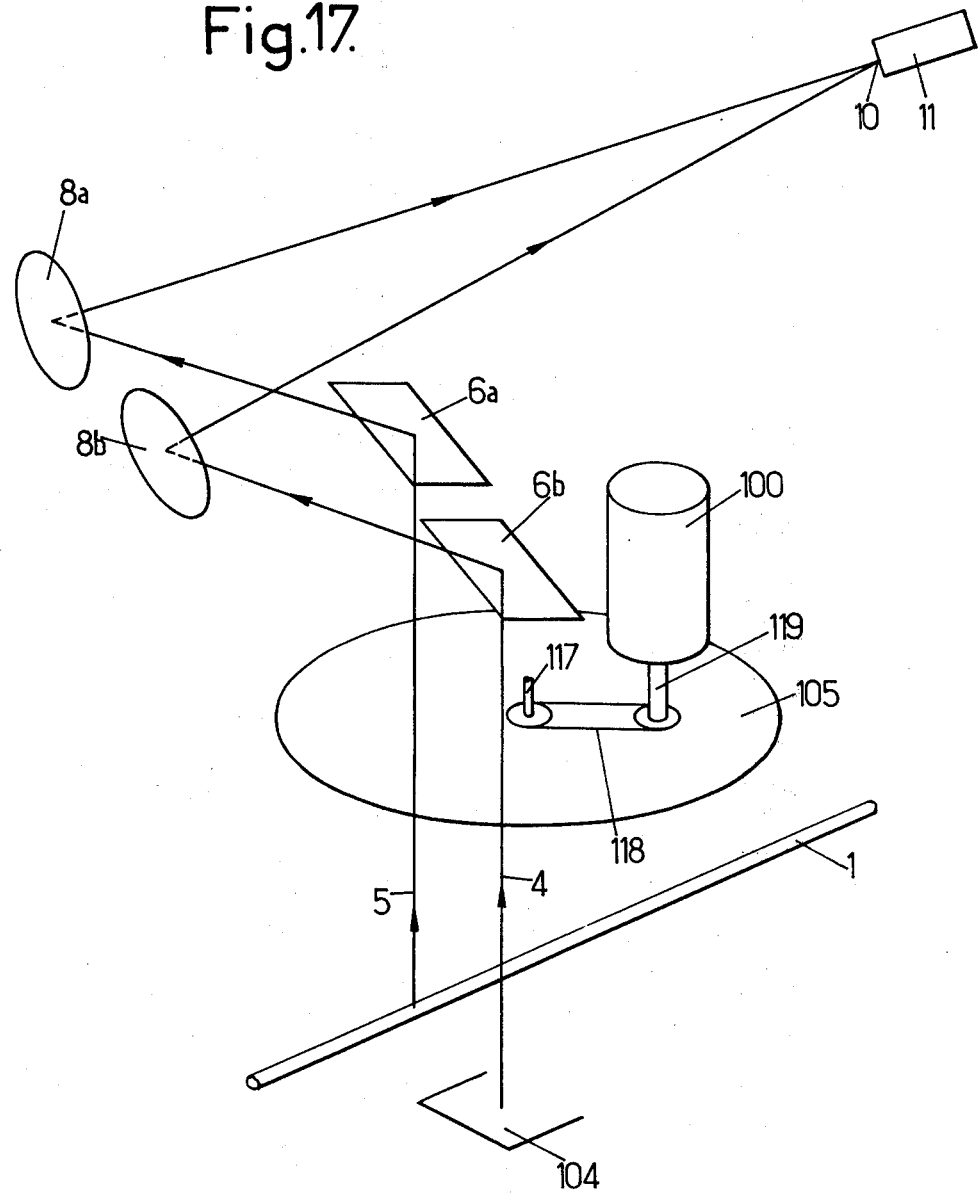
FIG. 17, finally, shows schematically the mechanical unit of the device of FIG. 13.

In FIG. 17 there is shown schematically in space the whole of the device having two pairs of fixed mirrors with a practical example of the drive for disk 105 effected by means of a motor 100 which drives shaft 117 of the disk not directly but through a belt device 118, the shaft 119 of motor 100 being staggered in relation to axis 117 which enables motor 100 and flat mirrors 6a and 6b to be disposed without problem.

As previously indicated, the device of FIGS. 13 to 17 presents a number of advantages with respect to the devices of FIGS. 1, 11 and 12, in particular the improvement in sensitivity, the ease of adjustment, the possibility of measuring the temperature of the body, such as tubes and bars, having even a relatively large section, without needing to use a large-sized black background and finally the use, under the best conditions, of synchronous detection because of the stability of the frequency of the detected infrared radiation. However, the devices of FIGS. 1, 11 and 12 are also suitable for some sizes of wire or metal sheet.

It is apparent that within the scope of the invention, modifications and different arrangements can be made other than are here disclosed. The present disclosure is merely illustrative with the invention comprehending all variations thereof.

We claim:

1. A device for measuring, by infrared thermometry, the temperature of a body having in at least one direction a small dimension, said device comprising:
   black body cavity means having an aperture formed therein to permit the escape of infrared radiation to be measured;
   infrared measuring means disposed for making a first set of measurements; each measurement of said first set being a measurement of the sum of the total amount of infrared radiation which is incident on a first solid angle and which comes from a portion of the body that is intercepted by said first solid angle and the total amount of infrared radiation which is incident on said first solid angle and which comes from a first portion of the interior wall of said cavity means that is intercepted by said first solid angle; and said infrared measuring means being disposed for making a second set of successive measurements alternating with said first set of measurements, such measurement of said second set being a measurement of the total amount of infrared radiation which is incident in a second solid angle equal to said first solid angle, which radiation comes from a second portion of said interior wall of said cavity means that is intercepted by said second solid angle; and
   means for generating an electrical signal representative of the difference between said sum and said total amount of infrared radiation that is incident on said second solid angle.

2. The device claimed in claims 1, wherein said infrared measuring means is a pyroelectric detector sensitive to all the infrared radiation emitted, by said body and, by said black background at all temperatures.

3. The device claimed in claim 1, wherein said interior wall comprises copper plates covered with colloidal graphite having a high emissive power.

4. The device claimed in claim 1, wherein said second portion of said interior wall of said cavity means is said first portion and without the body being intercepted by said second solid angle.

5. The device claimed in claim 1, further comprising concave spherical mirror means for collecting said infrared radiation and directing it to said infrared measuring means, and further comprising flat mirror means for directing said radiation from said cavity means to said concave spherical mirror means.

6. The device claimed in claim 5, wherein said flat mirror means comprises first and second fixed flat mirrors and wherein said concave spherical mirror means comprises first and second concave spherical mirrors corresponding respectively to said first and second fixed flat mirrors, said first mirrors being for directing to said infrared measuring means said infrared radiation for making said first set of measurements and said second mirrors being for directing infrared radiation to said infrared radiation measuring means for making said second set of measurements.

7. The device as claimed in claim 6, further comprising a disk intercepting the path of infrared radiation from said cavity means to said flat mirrors and further comprising means for rotating said disk at a constant speed; said disk having a first region which is opaque to infrared radiation, and a second region that is transparent to infrared radiation and that is positioned to permit infrared radiation to pass from said cavity means to said first flat mirror, and a third region that is transparent to infrared radiation and that is positioned to permit infrared radiation to pass through it from said cavity means to said second flat mirror, said second and third regions being so located relative to each other as to permit said first and second sets of measurements to be made successively and alternately.

8. The device claimed in claims 6, wherein said flat mirrors and said concave spherical mirrors are so disposed that said infrared measuring means receives the infrared radiation from the body and the infrared radiation from said black background at the same angle and along substantially the same optical path.

9. The device claimed in claim 1, wherein said first portion of said interior wall has a rectangular section.

10. The device claimed in claim 1, further comprising heating elements and a thermostat system for maintaining said black body cavity means at a predetermined desired temperature.

11. The device claimed in claim 1, wherein said infrared measuring means is for generating an electrical signal and wherein said determining means generates, responsive to said electrical signal, an output signal representative of said difference.

12. The device claimed in claim 11, further comprising: means for converting said output signal into an additional signal that is symmetrical with respect to a predetermined reference voltage; detecting means for separately detecting positive and negative peak values of said additional signal; and summing means for generating a signal representative of the algebraic sum of said positive and negative peak values.

13. The device claimed in claim 12, further comprising: means for generating a first pulse train, the pulses of which are synchronized with the peaks of said output signal; and means for generating a second pulse train comprising a succession of pairs of synchronized symmetrical pulses, one pulse of each said pair being positive and the other being negative, and the two pulses of each said pair having the same amplitude and duration; the pulses of each said pair having leading edges that are delayed relative to the leading edge of a corresponding pulse of said first pulse train; said means for separately detecting said positive and negative peak values being operative only during the duration of said pulses of said second pulse train.

14. The device claimed in claim 13, further comprising means for generating, responsive to said first pulse train, a third pulse train, each pulse of said third pulse train preceding a corresponding said pair of pulses of said second pulse train; said means for generating said second pulse train comprising storage means for storing said symmetrical signal and means for discharging said storage means responsive to each pulse of said third pulse train, said storage means being operative to store said symmetrical signal only during the duration of said pulses of said second pulse train.

15. A process for measuring by infrared thermometry the temperature of a body in front of a black background, the body having in at least one direction a relatively small dimension, said process comprising the steps of:
 (a) measuring the sum of the total amount of infrared radiation which is incident on a predetermined first solid angle and which comes from a portion of the body intercepted by said first solid angle, and the total amount of infrared radiation which is incident on said predetermined first solid angle and which comes from a first portion of said black background which first portion is intercepted by said first solid angle;
 (b) then measuring the total amount of infrared radiation which is incident on a second solid angle equal to said first solid angle and which radiation comes from a second portion of said black background that is intercepted by said second solid angle, said second solid angle being such that the body is entirely exterior to said second solid angle; and
 (c) determining the difference between the respective amounts of infrared radiation measured by means of said two measuring steps.

16. The process as claimed in claim 15, further comprising the step of repeating said steps (a), (b) and (c) in the order given, continuously.

17. The process claimed in claim 16, wherein said first measuring step (a) comprises using a flat swinging mirror to direct said infrared radiation which comes from the portion of the body and the radiation which comes from said first portion of the black background to a fixed concave spherical mirror, and wherein said second measuring step (b) comprises moving said flat swinging mirror to a second position and using it while in said second position to direct said infrared radiation which comes from the second portion of the black background to said fixed concave spherical mirror for collection of said radiation.

18. The process claimed in claim 16, wherein said first measuring step (a) comprises using a first fixed flat mirror to direct the infrared radiation which comes from the portion of the body and the radiation which comes from said first portion of said black background to a first concave spherical mirror to collect said radiation, and wherein said second measuring step (b) comprises using a second fixed flat mirror to direct said infrared radiation which comes from said second portion of said black background to a second concave spherical mirror to collect said radiation.

19. The process claimed in claim 16, further comprising the steps of:
 generating an electrical signal representative at each instant of the intensity of infrared radiation being measured at that instant;
 processing said electrical signal to make it symmetrical with respect to a predetermined reference potential to produce thereby a symmetrical signal;
 detecting the positive and negative peak values of said symmetrical signal; and
 determining the algebraic sum of said positive and negative peak values.

20. The process claimed in claim 19, further comprising the steps of:
 producing a series of pulses; and
 during the duration of each said pulse, sampling said symmetrical signal to form positive and negative peak signals representative, respectively, of said positive and negative peak values.

* * * * *